Patented June 6, 1967

3,323,404
EXPANSION BOLT ARRANGEMENT
Artur Fischer, Tumlingen, Kreis Freudenstadt, Germany
Filed Feb. 24, 1965, Ser. No. 434,993
Claims priority, application Germany, Nov. 7, 1958,
F 26,977; Nov. 22, 1958, F 27,092, Feb. 26, 1964,
F 42,134
5 Claims. (Cl. 85—83)

The present application is a continuation-in-part of the U.S. patent application Ser. No. 109,141 filed May 10, 1961, now Patent No. 3,171,321. This application Ser. No. 109,141, in turn, is a continuation-in-part of the earlier filed application Ser. No. 850,196 filed on Nov. 2, 1959, now abandoned.

The present invention relates to an expansion bolt arrangement, and more specifically to an expansion bolt provided with means for preventing rotation of the expansion bolt during inserting and spreading the same in a bore of the wall or the like in which the expansion bolt is to be applied.

Exansion bolts are pushed in unexpanded position in a bore of the wall or a similar member of a diameter substantially equal to that of the bolt in unexpanded position, and then expanded by driving a screw or similar member into a central longitudinally extending bore in the expansion bolt. Considerable difficulties are encountered in expanding such an expansion bolt by means of a screw in the aforementioned manner, especially if the bore in the wall or the element to which the bolt has to be fastened is slightly greater than the outside diameter of the bolt in unexpanded condition, or if the bore in the wall is deeper than the length of the expansion bolt. When the friction between the screw and the central bore in the expansion bolt is greater than the friction between the outer surface of the unexpanded bolt and the inner surface of the bore in the wall, the expansion bolt will turn with the screw during turning of the latter and expanding of the bolt will not occur. Likewise, if the bore in the wall is deeper than the length of the expansion bolt, application of pressure on the screw during its turning will drive the bolt into the bore to an undesired extent.

It is an object of the present invention to overcome this disadvantage of expansion bolts known in the art.

It is a further object of the present invention to provide on an expansion bolt means which will prevent turning of the bolt during expanding of the same relative to the inner surface of the bore in which the bolt has to be expanded.

It is also an object of the present invention to provide for an expansion bolt arrangement in which driving of the bolt to an undesired extent into the bore in which it is to be expanded is prevented.

Finally, it is also an object of the present invention to provide for an expansion bolt arrangement which will work equally well regardless of whether the expansion bolt is used in a bore formed in very hard or relatively soft material.

With these objects in view, the expansion bolt arrangement according to the present invention mainly comprises an elongated pin member of resiliently deformable material, for instance plastic, formed with substantially central bore extending longitudinally therethrough and having at one end of the pin member a greater diameter than at the other end thereof and between these ends a tapering portion. The pin member is also formed with a slot extending transversely through the pin member and in longitudinal direction from the other end of the pin member toward but short of the one end, and at least one short resilient tongue integrally connected at one end thereof to the pin member in the region of the other end of the latter. This short resilient tongue is connected to the pin member so that it extends from the connected end outwardly inclined to the axis of the pin member or the short resilient tongue may be bent to extend outwardly inclined to the axis of the pin member. Preferably a pair of such short resilient tongues are provided on the end of the pin member which, during driving of the pin member in a bore is the leading end and the short resilient tongues in the pair of tongues are arranged opposite to each other.

These short and rather stubby tongues on the leading end of the pin member will considerably increase the friction between the pin member and the surface of the bore in which the pin member is driven to provide a positive check against rotation of the expansion bolt during expanding of the same, as well as a positive check against undesired longitudinal movement of the expansion bolt when, during its expansion, pressure or tension is applied against its outer end.

In order to use the expansion bolt arrangement in a bore provided in an element which is formed from either hard or relatively soft material, it is preferred to provide on the pin member tongues of different lengths and/or thickness which are spread or spreadable toward the trailing end of the pin member, that is, the outer end thereof when the expansion bolt is located in a bore.

In this case, it is especially advantageous to provide the short and stubby tongues on the leading end of the pin member which will act especially during use of the expansion bolt arrangement in a bore formed in an element of hard material, and to provide relatively long and weaker tongues in a middle portion of the pin member which will act during use of the expansion bolt in a bore formed in a member of relatively soft material.

Preferably, a cutout of suitable length and depth is provided on the pin member for each of the tongues so that the latter may, during expansion of the pin member, resiliently bend into the corresponding cutouts. If the pin member is provided at the outer surface thereof with a plurality of transverse teeth separated by grooves from each other it is not necessary to provide separate cutouts for the short tongues if the latter have a length not greater than the width of the respective groove.

As mentioned above, it is not necessary to form the tongues in such a manner that they extend inclined to the axis of the pin member, but the tongues may also be formed to be retained in their respective cutouts so as not to extend beyond the outer circumference of the pin member and the tongues as formed may be bent before the expansion bolt arrangement is used so that the free ends of the tongues will be properly spread to extend outwardly beyond the outer surface of the pin member.

The novel features which are considered as characteristic for the invention are set forth in particular in the appended claims. The invention itself, however, both as to its constructions and its method of operation, together with additional objects and advantages thereof, will be best understood from the following description of specific embodiments when read in connection with the accompanying drawings, in which:

Figure 1:
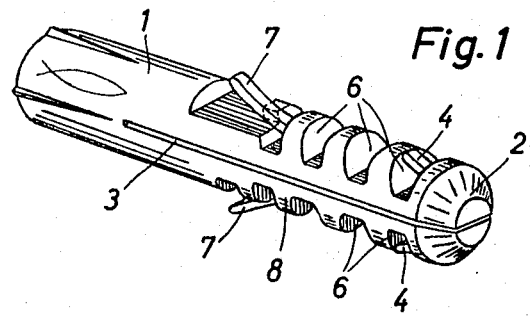
FIG. 1 is a perspective view of one modification of an expansion bolt arrangement according to the present invention.

Referring now to the drawings, and more specifically to FIG. 1 of the same it will be seen that the expansion bolt arrangement illustrated in this figure includes a substantially cylindrical elongated pin member 1 formed with a transverse slot 3 therethrough which extends in longitudinal direction of the pin member from the frustoconical end 2 of the same toward but short of the other end of the pin member so as to divide the latter into two pin portions connected at one end of the pin member in the region of one end thereof. Each of the pin portions is formed with a plurality of grooves 6 spaced from each other in longitudinal direction of the pin member 1 and extending transverse to the axis thereof from the outer surface of the respective pin portion toward but short of the slot 3 so as to form on each pin portion a plurality of axially spaced teeth 8. The arrangement includes further two short and rather stubby tongues 4 integrally connected at one end thereof to the tooth 8 adjacent the end 2 of the pin member and each projecting from the connected end toward the other end of the pin member. The two tongues 4 have a length not exceeding the width of the slot 6 adjacent the tooth to which the tongues are connected so that the tongues 4 may be lodged in the respective slots or be bent outwardly to extend with the free ends thereof beyond the periphery of the pin member. The arrangement includes further two additional tongues 7 which are longer than the tongues 4 and which may also have a thickness slightly smaller than that of the tongues 4. The tongues 7 are connected at one end thereof to opposite teeth 8 projecting from a middle portion of the pin member and they project respectively from the connected end towards the end of the pin member which is opposite the end 2. Since the tongues 7 are longer than the spacing between adjacent teeth, appropriate cutouts are formed in the pin member so that the tongues may be lodged in the cutouts or be spread to extend with the free end beyond the circumference of the pin member. While not shown in FIG. 1, it is to be understood that the pin member 1 shown in FIG. 1 is provided with a central bore 10 therethrough, as shown in FIG. 2, which has at one end of the pin member a large diameter portion 10' and at the other end of the pin member a small diameter portion 10" and a tapering portion 10''' connecting the two aforementioned bore portions in the manner as clearly shown in FIG. 2.

Figure 2:
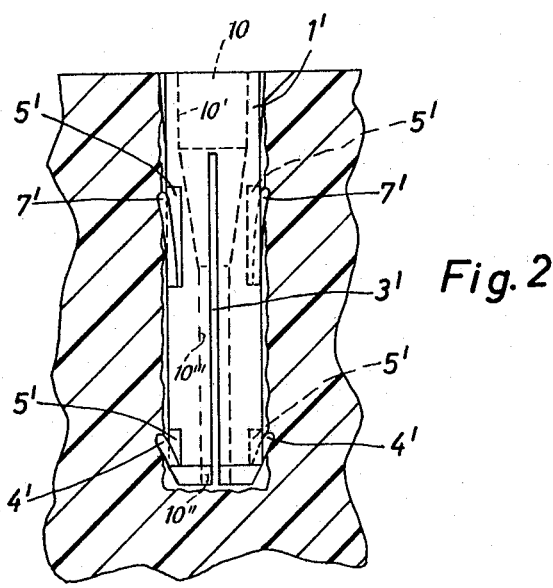
FIG. 2 is a partly sectioned front view showing an expansion bolt arrangement driven into a bore of an element and this figure shows the bolt in unexpanded position.

FIG. 2 shows another modification of an expansion bolt arrangement according to the present invention, with the pin member 1' located in a bore of a wall or similar element in which the expansion bolt has to be fastened. FIG. 2 shows the pin member 1' in unexpanded position. The pin member 1' shown in FIG. 2 is provided with a longitudinal transverse slot 3' extending from the inner end of the pin member toward but short of the outer end thereof so as to provide two pin portions integrally connected at the outer ends thereof. Each of the pin portions is provided at its inner end with a pair of short and stubby tongues 4' integrally connected at one end thereof to the inner end of the respective pin portion and projecting from the connected end outwardly inclined to the axis of the pin member toward the outer end thereof. Appropriate cutouts 5' are provided for each of the tongues 4' so that the latter may be bent, during expansion of the pin member, into the respective cutouts. The arrangement shown in FIG. 2 also includes a pair of additional tongues 7' which are longer and preferably slightly weaker than the tongues 4'. The tongues 7' are connected at one end thereof to a middle portion of the respective pin portion and each of the tongues 7' projects from the connected end outwardly inclined with respect to the axis of the pin member toward the outer end thereof. Appropriate cutouts 5' are also provided for each of the tongues 7' so that the latter may during expansion of the expansion bolt arrangement be lodged in part or entirely in the respective cutouts.

Figure 3:
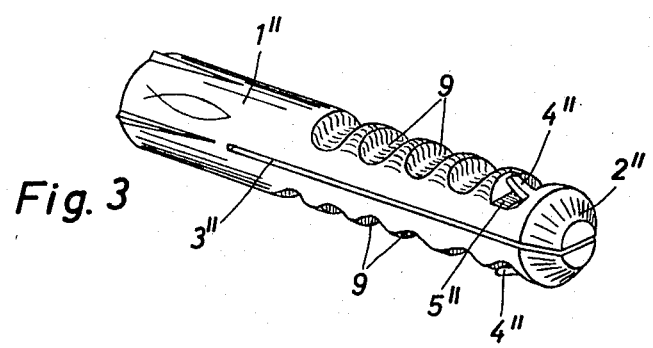
FIG. 3 is a perspective view of a further modification of an expansion bolt arrangement according to the present invention.

FIG. 3 shows a further modification of an expansion bolt arrangement according to the present invention and the arrangement shown in FIG. 3 includes a pin member 1'' formed with a slot 3'' therethrough extending from the conical end 2'' of the pin member toward but short of the other end thereof so as to divide the pin member into two pin portions connected at one end. Each of the pin portions is again provided with a plurality of grooves 9 spaced from each other in longitudinal direction of the pin member and extending transverse to the axis thereof from the outer surface of the respective pin portion toward but short of the slot 3'' so as to form on each pin portion a plurality of axially spaced teeth. The arrangement includes further two short and stubby tongues 4'', each connected at one end thereof to the tooth of the respective pin portion whic his closest to the end 2''. The length of each tongue 4'' does not exceed the width of the groove 5'' adjacent to the tooth to which one end of each tongue 4'' is connected so that the tongues 4'' may be respectively lodged in the grooves 5'' or be spread at the free ends to extend beyond the circumference of the pin.

The pin members shown in FIGS. 1–3 and the tongues integrally connected thereto are preferably molded from plastic material.

The expansion bolt arrangement above described is used as follows:

The tongues 4 and/or 7 are either formed prespread to extend with the free ends beyond the outer surface of the pin member, or the tongues are bent before the pin member is driven into a corresponding bore in a wall or the like to extend with the free ends outwardly beyond the circumference of the pin member. After the pin member is placed in the bore, a screw of an outer diameter greater than the diameter of the bore portion 10'', shown in FIG. 2, is placed into the bore 10, the screw is then turned and driven in the bore so that the two portions of the pin member provided by the longitudinal slot are spread apart. The spread tongues which will engage the inner surface of the bore formed in the wall or the like with considerable pressure which will prevent rotation of the expansion bolt relative to the surface of the bore in which the expansion bolt is located during driving of a screw into the expansion bolt. If the bore in which the bolt is located should be deeper than the length of the pin member, undesired longitudinal displacement of the pin member in the bore will also be prevented by the short and stubby tongues.

It will be understood that each of the elements described above, or two or more together, may also find a useful application in other types of expansion bolt arrangements, differing from the types described above.

While the invention has been illustrated and described as embodied in an expansion bolt arrangement provided with resilient tongues for preventing undesired rotation or longitudinal displacement of the expansion bolt during expanding the same, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an expansion bolt arrangement, comprising, in combination, an elongated pin member of resiliently deformable material formed with a substantially central bore therethrough having at one end of said pin member a greater diameter than at the other end thereof and between said ends a tapering portion, said pin member being also formed with a slot extending transversely therethrough and in longitudinal direction from said other end of said pin member toward but short of said one end; a first pair of short and relatively thick resilient tongues each integrally connected at one end thereof to said pin member in the region of the other end of the latter; and a second pair of tongues longer and thinner than the tongues of said first pair of tongues and each tongue of said second pair of tongues being integrally connected at one end thereof to an intermediate portion of said pin member located between the ends thereof, the tongues in each pair being arranged opposite each other and projecting from the connected end thereof toward said one end of said pin member outwardly inclined to the axis of the latter.

2. In an expansion bolt arrangement as set forth in claim 1, wherein the free ends of the tongues in said second pair of tongues are spaced further from said one end of said pin than the end of the slot which is nearer to said one end of the pin.

3. In an expansion bolt arrangement, comprising, in combination, an elongated pin member of resiliently deformable material formed with a substantially central bore therethrough having at one end of said pin member a greater diameter than at the other end thereof and between said ends a tapering portion, said pin member being also formed with a slot extending transversely therethrough and in longitudinal direction from said other end of said pin member toward but short of said one end; a first pair of short and relatively thick resilient tongues each integrally connected at one end thereof to said pin member in the region of the other end of the latter; and a second pair of tongues longer and thinner than the tongues of said first pair of tongues and each tongue of said second pair of tongues being integrally connected at one end thereof to an intermediate portion of said pin member located between the ends thereof, the tongues in each pair being arranged opposite each other and projecting from the connected end thereof toward said one end of said pin member outwardly inclined to the axis of the latter, said pin being formed in the region of each tongue with a cutout of a length substantially equal to that of the respective tongue and a depth substantially equal to the thickness of the respective tongue so that during insertion of said pin in a bore, the projecting portions of said tongues may be resiliently bent into the respective cutouts, the connected end of each tongue being located in the respective cutout.

4. In an expansion bolt arrangement, comprising, in combination, an elongated pin member of resiliently deformable material formed with a substantially central bore therethrough having at one end of said pin member a greater diameter than at the other end thereof and between said ends a tapering portion, said pin member being also formed with a slot extending transversely therethrough and in longitudinal direction from said other end toward but short of said one end of the pin member so as to divide the latter into two pin portions connected to each other in the region of said one end of said pin member, each of said pin portions being formed with a plurality of grooves spaced from each other in longitudinal direction of said pin member and extending transverse to the axis thereof from the outer surface of the respective pin portion toward but short of said slot so as to form at each pin portion a plurality of axially spaced teeth; and at least one short tongue integrally connected at one end thereof to a face of one tooth facing said one end of said pin member, projecting from said connected end in longitudinal direction of said pin member and having the tendency to project outwardly beyond said tooth, said short tongue having a length not exceeding the width of the groove adjacent to the tooth to which said short tongue is integrally connected so that said short tongue is adapted to be resiliently bent into said groove.

5. In an expansion bolt arrangement, comprising, in combination, an elongated pin member of resiliently deformable material formed with a substantially central bore therethrough having at one end of said pin member a greater diameter than at the other end thereof and between said ends a tapering portion, said pin member being also formed with a slot extending transversely therethrough and in longitudinal direction from said other end toward but short of said one end of the pin member so as to divide the latter into two pin portions connected to each other in the region of said one end of said pin member, each of said pin portions being formed with a plurality of grooves spaced from each other in longitudinal direction of said pin member and extending transverse to the axis thereof from the outer surface of the respective pin portion toward but short of said slot so as to form at each pin portion a plurality of axially spaced teeth; and at least one tongue integrally connected at one end thereof to a face of one tooth forming that wall of one of said grooves which faces said one end of said pin member and projecting from said connected end in longitudinal direction of said pin member towards said one end thereof, said tongue having a length exceeding the width of said groove and having the tendency to project outwardly beyond said tooth; and a depression in said pin member in the face forming the other wall of the respective groove, said depression being located and shaped so that that portion of said tongue which exceeds the width of said groove is adapted to be bent into said depression.

References Cited
UNITED STATES PATENTS

| | | | |
|---|---|---|---|
| 1,288,177 | 12/1918 | Pleister | 85—83 |
| 1,470,858 | 10/1923 | Maxwell | 85—83 |
| 3,171,321 | 3/1965 | Fischer | 85—83 |
| 3,236,145 | 2/1966 | Schenkel | 85—83 |

FOREIGN PATENTS 683,659   4/1964   Canada.

CARL W. TOMLIN, *Primary Examiner.*

R. S. BRITTS, *Assistant Examiner.*